US006950414B1

(12) United States Patent  
Grohn et al.

(10) Patent No.: US 6,950,414 B1
(45) Date of Patent: Sep. 27, 2005

(54) CABLE CARRYING COMMUNICATIONS DATA AND TIMING DATA TO RADIO HEADS

(75) Inventors: Ossi I. Grohn, Apex, NC (US); Johnny D. Shepherd, Hillsborough, NC (US)

(73) Assignee: Ericsson Inc., Research Triangle Park, NC (US)

( * ) Notice: Subject to any disclaimer, the term of this patent is extended or adjusted under 35 U.S.C. 154(b) by 1087 days.

(21) Appl. No.: 09/690,258

(22) Filed: Oct. 17, 2000

(51) Int. Cl.[7] .......................... H04Q 7/00; H04B 7/005; H04J 3/06
(52) U.S. Cl. .................. 370/328; 370/350; 370/503; 455/502; 455/68
(58) Field of Search ........................... 370/310, 328, 370/329, 342–346, 389, 396, 395.53, 395.62, 370/438, 464, 465, 503, 350; 455/68, 502

(56) References Cited

U.S. PATENT DOCUMENTS

| | | | | | |
|---|---|---|---|---|---|
| 3,924,082 | A | * | 12/1975 | Oliver et al. | 370/267 |
| 5,119,402 | A | * | 6/1992 | Ginzburg et al. | 375/288 |
| 5,636,213 | A | * | 6/1997 | Eastmond et al. | 370/278 |
| 6,262,993 | B1 | * | 7/2001 | Kirmse | 370/463 |
| 6,628,968 | B1 | * | 9/2003 | Grohn | 455/560 |

FOREIGN PATENT DOCUMENTS

GB 2 321 827 A 8/1998

* cited by examiner

Primary Examiner—Hassan Kizou
Assistant Examiner—Gregory B Sefcheck
(74) Attorney, Agent, or Firm—Coats & Bennett, P.L.L.C.

(57) ABSTRACT

A method and apparatus for providing timing information to radio heads in a wireless communications system. One or more radio heads are connected to a central unit by a respective cable. This cable includes at least two sets of conductors. The first set carries communication data between the central unit and the radio head. This communication data may be user data, such as voice, data, or fax data, and optionally control data. This communication data is transferred between the radio head and the central unit using an asynchronous transmit method. Due to its variable timing of successful receipt, it may be difficult to send highly accurate timing data via asynchronous transmit methods. Instead, a synchronous transmit method may be advantageously employed to send timing data in the present invention. The timing data is sent on the second set of conductors of the same cable using a synchronous transmit method. Thus, each cable of the present invention carries both asynchronous transmissions and synchronous transmissions. The cable may advantageously be a portion of an existing LAN cable plant, and the asynchronous transmit method may be according to an Ethernet protocol. One or more radio heads may be supplied with timing data in this fashion. The timing of radio frequency transmissions from those radio heads may then be based on the supplied timing information, for instance to coordinate the transmissions from multiple radio heads so as to be simultaneous.

29 Claims, 1 Drawing Sheet

CABLE CARRYING COMMUNICATIONS DATA AND TIMING DATA TO RADIO HEADS

BACKGROUND OF THE INVENTION

The present invention relates to wireless communications systems, and more particularly to provision of timing information in a wireless communications system.

In the context of wireless communications systems, it is frequently desirable to control the timing of transmissions. For instance, it may be desirable for to control the timing of the transmissions of one or more radio heads of what is typically referred to as a pico base station. To achieve the desired level of control, it may be necessary for the radio head(s) to have access to high resolution timing signals. Just by way of example, such high resolution timing signals may include a Carrier Frequency Reference and a Air Frame Synchronization signals for cellular communications, with accuracy requirements in the general range of 0.1 ppm. Providing the radio heads with access to accurate timing signals may be difficult and/or expensive in some situations.

BRIEF SUMMARY OF THE INVENTION

The present invention provides a method and apparatus for providing timing information to radio heads in a wireless communications system. One or more radio heads are connected to a central unit by a respective cable. This cable includes at least two sets of conductors. The first set carries communication data between the central unit and the radio head. This communication data is user data, such as voice, data, or fax data, and optionally control data. This communication data is transferred between the radio head and the central unit using an asynchronous transmit method. Due to its variable timing of successful receipt, it is difficult to send highly accurate timing data via asynchronous transmit methods. Instead, a synchronous transmit method may be advantageously employed to send timing data in the present invention. The timing data is sent on the second set of conductors of the same cable using a synchronous transmit method. Thus, each cable of the present invention carries both asynchronous transmissions and synchronous transmissions. The cable may advantageously be a portion of an existing LAN cable plant, and the asynchronous transmit method may be according to an Ethernet protocol. One or more radio heads may be supplied with timing data in this fashion. The timing of radio frequency transmissions from those radio heads may then be based on the supplied timing information, for instance to coordinate the transmissions from multiple radio heads so as to be simultaneous.

DETAILED DESCRIPTION OF THE INVENTION

Figure 1:
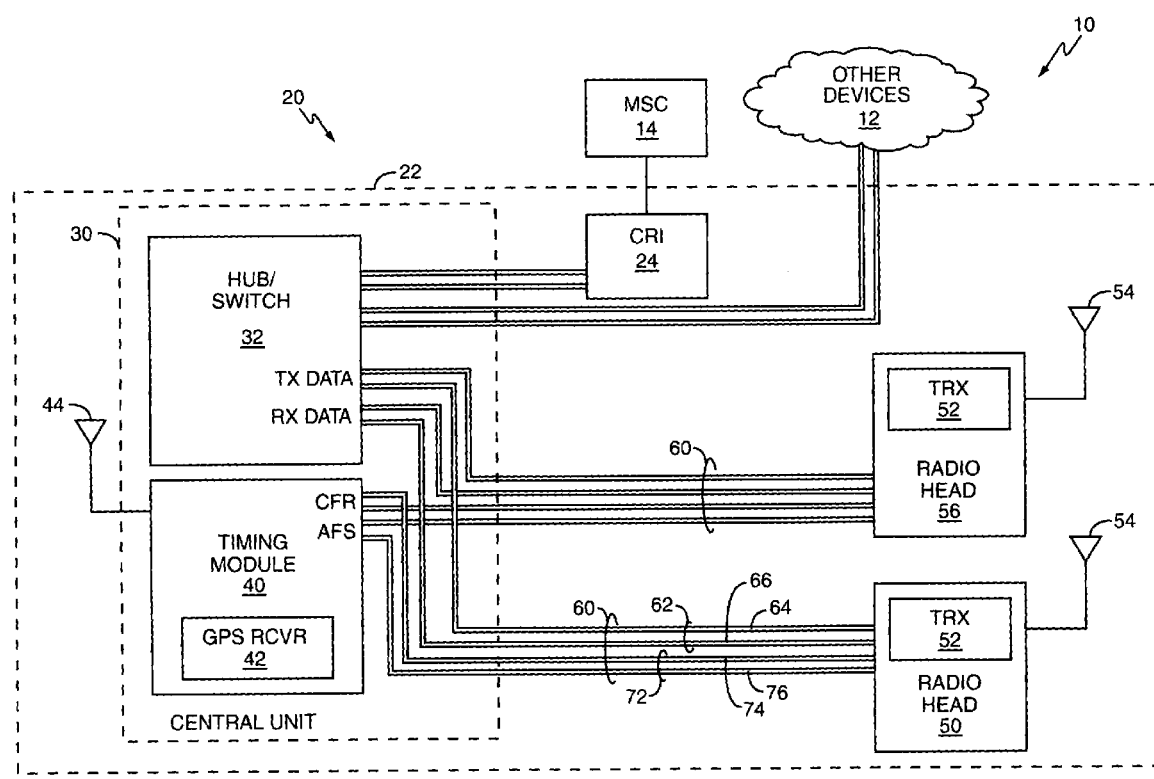
FIG. 1 shows a local wireless telecommunications network adapted to supply timing data according to the present invention.

The present invention provides an approach to providing timing information to one or more radio heads 50,52 in a wireless communications system. For purposes of illustration, the present invention will be discussed in the context of a low power wireless communications base station 22 for a local wireless telecommunications network 20. However, the present invention is not intended to be limited by this illustrative context.

Referring to FIG. 1, a base station according to one aspect of the present invention is shown as a portion of a local wireless telecommunications network 20, such as one installed in a building or on a campus. The local wireless telecommunications network 20 allows employees or other persons working in the building or on the campus to use a wireless communications mobile terminal, such as a cellular telephone, as an office telephone. The local wireless telecommunications network 20 is typically a private system, but the local wireless telecommunications network 20 may advantageously be connected to a Mobile Switching Center 14 in the Public Land Mobile Network (PLMN) so as to allow users of the local wireless telecommunications network 20 to move seamlessly between the PLMN and the local wireless telecommunications network 20.

In the context of the present invention, at least some portions of the local wireless telecommunications network 20 are connected using portions of a Local Area Network (LAN) 10. This LAN may be used for a wide variety of purposes, such as interconnecting various computers, printers, servers, and the like 12, that are unrelated to the telecommunications network. While the LAN 10 may take a variety of forms, one particularly popular LAN configuration is a star configuration using Ethernet protocols. Such LANs 10 typically employ one or more hubs or switches 32 to route signals from one location to another on the network 10. Thus, the data flowing from one location on the network to another location on the network typically goes through the hub 32 to reach its destination. Ethernet protocols include those defined in the IEEE 802.3 standard, and other protocols such as the "gigabyte" Ethernet protocol currently under development. One characteristic of Ethernet protocols is that they employ Carrier Sense Multiple Access with Collision Detection (CSMA/CD). Under CSMA/CD, successive data segments are not necessarily successfully received at their destination in uniformly spaced time intervals because collisions may occur for some data segments, requiring retransmission for successful receipt, while other data segments may not be subject to collisions. Thus, the time intervals between successful receipt of successive data segments may vary widely. Thus, a communications data stream of segments A, B, C, D, may take anywhere from four to ten or more transmission attempts to be successfully received by the destination. As such, Ethernet and similar network transmit methods are defined as being asynchronous transmit methods. An asynchronous transmit method, as that term is used herein, means that successive segments of the data may be received at the destination at non-uniform intervals; thus, the elapsed time from the successful receipt of successive data segments may vary. In contrast, a synchronous transmit method, as that term is used herein, means that successive segments of the data are sent at uniform intervals.

As is known in the art, local wireless telecommunications networks 20 typically include one or more base stations 22. Because these base stations 22 typically operate over limited geographic areas, using what are typically relatively low power transmitters, these base stations 22 are sometimes called pico base stations 22. For purposes of the present invention, the local wireless telecommunications network base station 22 includes a control radio interface 24, a central unit 30, and one or more radio heads 50,56. The control radio interface 24 typically includes one or more processors that oversee the operation of the base station 22 and communications with the Mobile Switching Center 14 of the PLMN. The central unit 30 includes an Ethernet hub or switch 32 and a timing module 40. The Ethernet hub 32 operates in a fashion well known in the art to route signals from one location to another on a network. For purposes of illustration, FIG. 1 shows the hub 32 connected in a star topography with the radio heads 50,56, the control radio interface 24, and a plurality of other devices 12, such as personal computers on the local area network 10. The timing module 40 serves to generate highly accurate timing information. While this function may be served by a wide variety of known devices, the timing module 40 will typically include a GPS receiver 42 coupled to a GPS antenna 44. In a fashion well known in the art, the GPS receiver 42 is able to generate highly accurate timing signals based on the information received from satellites via the GPS antenna 44. It should also be noted that the central unit 30 may optionally include the control radio interface 24, but this is not required.

Radio head 50 includes a transceiver 52 (TRX) and an antenna 54. The radio head 50 receives data to be transmitted ("transmit data") from the hub 32, converts that data to a form suitable to transmission on a radio frequency, and transmits the same via antenna 54. In addition, the radio head 50 receives data from various mobile terminals ("receive data") via antenna 54, converts the same to a suitable form, and forwards the same to the control radio interface 24 via hub 32. This transmit and receive function of the radio head 50 is well known in the art and need not be detailed further herein.

The radio heads 50,56 are connected to the hub 32 via respective cables 60. These cables 60 may take a variety of forms, but in this illustrative example take the form of a category 5 Ethernet cable. As is known in the art, a category 5 Ethernet cable 60 is typically an eight conductor unshielded twisted pair cable divided into four twisted pairs 64,66,74,76. A fuller specification of category 5 Ethernet cable may be found in IEEE 802.3. In a typical arrangement, one twisted pair 64 connecting the hub to the respective radio head is used for transmit data, while another twisted pair 66 is used for receive data. For ease of reference, these two twisted pairs may be called the first set of conductors 62, while the two remaining twisted pairs 74,76 may be called the second set of conductors 72. Of course, neither the first set of conductors 62 nor the second set of conductors 72 need have four conductors, more or less may be appropriate depending on the particular configuration chosen. In addition, the cables 60 may contain additional conductors.

The second set of conductors 72 is used to connect the timing module 40 to the respective radio head 50 or 56 for supplying timing data thereto. For the embodiment shown in FIG. 1, the timing module 40 supplies timing data known as Carrier Frequency Reference (CFR) on one twisted pair 74 of the second set of conductors 72 and optionally Air Frame Synchronization (AFS) on another twisted pair 76 of the second set of conductors 72. The CFR is intended to provide a stable frequency reference for aiding in the generation of the RF carrier frequency within the radio head 50. The AFS is intended to provide synchronization information useful in synchronizing transmit bursts from multiple radio heads 50. Of course, other timing signals may additionally or alternatively be provided to the radio head 50 via the second set of conductors 72. While these timing data signals may only require one conductor each, the timing signals may advantageously be differentially generated, requiring two conductors each.

It should be noted that generation of the CFR and AFS timing signals may be accomplished in any fashion known in the art. Just by way of example related to the configuration shown in FIG. 1, GPS timing data from the GPS receiver 42 may advantageously be used to generate the timing signals. For instance, the 10 MHz carrier signal for GPS transmissions may be directly forwarded, or divided down if appropriate, as the CFR. Likewise, GPS signals also typically include a pulse event per second that may be used either to drive an oscillator in the timing module 40 to generate the AFS or may be forwarded as the CFR.

Thus, each radio head 50,56 is connected to the central unit 30 by a respective cable 60. This cable 60 includes at least two sets of conductors 62,72. The first set of conductors 62 carries communication data between the central unit 30 and the respective radio head 50 or 56. This communication data is user data, such as voice, data, or fax data, and optionally control data, such as transmit power level, transmit frequency, and the like. This communication data is transferred between the radio head 50,56 and the central unit 30 using an asynchronous transmit method. Due to its variable timing of successful receipt, it is difficult to send highly accurate timing data via asynchronous transmit methods. Instead, a synchronous transmit method may be advantageously employed to send timing data. In the present invention, the timing data is sent on the second set of conductors 72 using a synchronous transmit method. Thus, each cable 60 of the present invention carries both asynchronous transmissions and synchronous transmissions.

A radio head 50,56 receives the timing data carried by the second set of conductors 72 of the respective cable 60 and bases the timing of its radio frequency transmissions thereon. For instance, the timing data may be used to establish the proper starting time of a transmit burst (e.g., AFS) or to establish the carrier frequency (e.g., CFR). Further, while the present invention may be used to send timing data to a single radio head 50, the present invention may advantageously be used to send timing data to two or more radio heads 50,56. For such situations, one cable 60 would carry communications data and timing data from the central unit 30 to a first radio head 50 while another cable 60 would carry communications data and timing data from the central unit 30 to a second radio head 56, and so forth. The timing data carried to the respective radio heads 50,56 may be the same data, merely split between the radio heads 50,56 in parallel fashion; or, the timing data may be custom generated for each radio head 50,56, taking into account the respective propagation delays and the like. The supply of the timing data to multiple radio heads 50,56 allows the timing of transmissions from the radio heads 50,56 to be controlled. For instance, the transmissions from a plurality of radio heads 50,56 may advantageously be controlled to happen simultaneously. Further, by supplying the timing data in the same cable 60 as communications data, the proliferation of cables 60 is reduced and existing cabling plant may be more readily utilized.

For simplicity, the illustrative example above has assumed that a LAN 10 is used to carry the communications data between the control radio interface 24 and the radio head(s) 50,56, via the hub 32. However, it should be noted that a LAN 10 per se is not required. Indeed, the cables 60 and hub 32 may be a portion of a Metropolitan Area Network, a Wide Area Network, both carrying data other than just the communications data, or may be solely dedicated to the local wireless telecommunications network 10.

The present invention may, of course, be carried out in other specific ways than those herein set forth without departing from the scope of the invention. The present embodiments are, therefore, to be considered in all respects as illustrative and not restrictive, and all changes coming within the meaning and equivalency range of the appended claims are intended to be embraced therein.

What is claimed is:

1. A method of providing timing information to one or more radio heads connected to a central unit of a wireless communications system, comprising:
   transferring data between the central unit and at least one radio head via a first set of conductors of a first cable using an asynchronous transmit method; and
   sending timing data from said central unit to said at least one radio head via a second set of conductors of said first cable using a synchronous transmit method.

2. The method of claim 1 wherein transferring data between said central unit and said at least one radio head via said first set of conductors of said first cable using an asynchronous transmit method comprises transferring said data between said central unit and said at least one radio head via said first set of conductors of said first cable using an Ethernet protocol.

3. The method of claim 2 wherein transferring said data between said central unit and said at least one radio head via said first set of conductors of said first cable using an Ethernet protocol comprises transferring said data between said central unit and said at least one radio head via said first set of conductors of said first cable according to 10/100 Base-T Ethernet protocols.

4. The method of claim 1 wherein:
   transferring said data between said central unit and said at least one radio head via said first set of conductors of said first cable using an asynchronous transmit method comprises transferring said data between said central unit and said at least one radio head via at least four conductors of said first cable; and
   sending said timing data from said central unit to said at least one radio head via said second set of conductors of said first cable using a synchronous transmit method comprises sending said timing data from said central unit to said at least one radio head via at least two conductors of said first cable.

5. The method of claim 4 wherein sending said timing data from said central unit to said at least one radio head via said second set of conductors of said first cable using a synchronous transmit method comprises sending said timing data from said central unit to said at least one radio head via said second set of conductors of an unshielded twisted pair first cable.

6. The method of claim 5 wherein sending said timing data from said central unit to said at least one radio head via said second set of conductors of an unshielded twisted pair first cable comprises sending said timing data from said central unit to said at least one radio head via said second set of conductors of a category 5 Ethernet cable first cable.

7. The method of claim 1 wherein said at least one radio head comprises at least one wireless radio transceiver and further comprising timing the radio signal transmissions of said wireless radio transceiver of said at least one radio head based on said timing data supplied to said at least one radio head via said second set of conductors of said first cable.

8. The method of claim 1 wherein sending timing data from said central unit to said at least one radio head via said second set of conductors of said first cable using said synchronous transmit method comprises sending Carrier Frequency Reference data from said central unit to said at least one radio head via said second set of conductors using said synchronous transmit method.

9. The method of claim 8 wherein sending Carrier Frequency Reference data from said central unit to said at least one radio head via said second set of conductors of said first cable using said synchronous transmit method comprises sending Carrier Frequency Reference data from said central unit to said at least one radio head via differential signaling on said second set of conductors of said first cable using said synchronous transmit method.

10. The method of claim 8 wherein sending timing data from said central unit to said at least one radio head via said second set of conductors of said first cable using said synchronous transmit method further comprises sending Air Frame Synchronization timing data from said central unit to said at least one radio head via said second set of conductors of said first cable using said synchronous transmit method.

11. The method of claim 10 wherein sending Air Frame Synchronization timing data from said central unit to said at least one radio head via said second set of conductors of said first cable using said synchronous transmit method comprises sending Air Frame Synchronization timing data from said central unit to said at least one radio head via differential signaling on said second set of conductors of said first cable using said synchronous transmit method.

12. The method of claim 10 wherein said second set of conductors comprises at least four conductors and wherein:
   sending Carrier Frequency Reference timing data from said central unit to said at least one radio head via said second set of conductors of said first cable comprises sending Carrier Frequency Reference timing data from said central unit to said at least one radio head via a first pair of conductors of said second set of conductors of said first cable; and
   sending Air Frame Synchronization timing data from said central unit to said at least one radio head via said second set of conductors of said first cable comprises sending Air Frame Synchronization timing data from said central unit to said at least one radio head via a second pair of conductors of said second set of conductors of said first cable.

13. The method of claim 1 further comprising receiving timing information at said central unit from a GPS receiver and wherein sending timing data from said central unit to said at least one radio head via said second set of conductors of said first cable comprises sending timing data based on said timing information from said central unit to said at least one radio head via said second set of conductors.

14. The method of claim 1 wherein said cable is a first cable and said at least one radio head is a first radio head and further comprising:
   transferring data between said central unit and a second radio head via a first set of conductors of a second cable using said asynchronous transmit method;
   sending timing data from said central unit to said second radio head via a second set of conductors of said second cable using said synchronous transmit method.

15. The method of claim 14 further comprising coordinating the timing of radio transmissions from said first and second radio heads via said timing data supplied to said first radio head via said first cable and via said timing data supplied to said second radio head via said second cable.

16. The method of claim 1:
   further comprising receiving timing information at said central unit from a GPS receiver;
   wherein said at least one radio head comprises at least one wireless radio transceiver;

wherein said first cable is a category 5 unshielded twisted pair Ethernet cable and wherein said first set of conductors of said first cable comprises at least four conductors of said first cable and wherein said second set of conductors of said first cable comprises at least two conductors of said first cable;

wherein sending timing data from said central unit to said at least one radio head via said second set of conductors of said first cable using said synchronous transmit method comprises sending Carrier Frequency Reference data from said central unit to said at least one radio head via said second set of conductors using said synchronous transmit method;

wherein sending timing data from said central unit to said at least one radio head via said second set of conductors of said first cable comprises sending timing data based on said timing information from said central unit to said at least one radio head via said second set of conductors; and further comprising timing the radio signal transmissions of said wireless radio transceiver of said at least one radio head based on said timing data supplied to said at least one radio head via said second set of conductors of said first cable.

17. The method of claim 16 wherein sending timing data from said central unit to said at least one radio head via said second set of conductors of said first cable using said synchronous transmit method further comprises sending Air Frame Synchronization timing data from said central unit to said at least one radio head via said second set of conductors of said first cable using said synchronous transmit method.

18. The method of claim 16 wherein said cable is a first cable and said at least one radio head is a first radio head and further comprising:
  transferring data between said central unit and a second radio head via a first set of conductors of a second cable using said asynchronous transmit method;
  sending timing data from said central unit to said second radio head via a second set of conductors of said second cable using said synchronous transmit method.

19. The method of claim 18 further comprising coordinating the timing of radio transmissions from said first and second radio heads via said timing data supplied to said first radio head via said first cable and via said timing data supplied to said second radio head via said second cable.

20. A wireless communications transceiver assembly comprising:
  a central unit comprising a GPS timing module coupled to a GPS antenna;
  a first radio head located remote from said central unit;
  a first cable connecting said central unit to said first radio head, said first cable comprising at least a first set of conductors and a second set of conductors;
  wherein data is transferred between said central unit and said first radio head via first set of conductors of said first cable using an asynchronous transmit method; and
  wherein timing data is sent from said GPS timing module to said first radio head via said second set of conductors of said first cable using a synchronous transmit method.

21. The assembly of claim 20 wherein said first cable comprises at least six conductors and wherein said first set of conductors of said first cable comprise at least two pair of conductors and wherein said second set of conductors of said first cable comprises at least one pair of conductors.

22. The assembly of claim 21 wherein said second set of conductors of said first cable comprises at least two pair of conductors.

23. The assembly of claim 22 wherein said first cable is a category 5 unshielded twisted pair Ethernet cable.

24. The assembly of claim 21 wherein said at least one pair of conductors of said second set of conductors of said first cable form at least a portion of a differential transmission link between said central unit and said first radio head.

25. The assembly of claim 20 wherein said first radio head comprises at least one wireless radio transceiver and wherein the timing the radio signal transmissions of said wireless radio transceiver of said first radio head is based on said timing data supplied to said first radio head via said second set of conductors of said first cable.

26. The assembly of claim 20 wherein said timing data comprises Carrier Frequency Reference data.

27. The assembly of claim 26 wherein said timing data comprises Carrier Frequency Reference data and Air Frame Synchronization timing data.

28. The assembly of claim 20 further comprising:
  a second radio head located remote from said central unit;
  a second cable connecting said central unit to said second radio head, said second cable comprising at least a first set of conductors and a second set of conductors;
  wherein data is transferred between said central unit and said second radio head via said first set of conductors of said second cable using an asynchronous transmit method; and
  wherein timing data is sent from said GPS timing module to said second radio head via said second set of conductors of said second cable using a synchronous transmit method.

29. The assembly of claim 28 wherein said first and second radio heads each comprise at least one wireless radio transceiver and wherein the timing of radio transmissions from said first and second radio heads is coordinated via said timing data supplied to said first radio head via said first cable and via said timing data supplied to said second radio head via said second cable.

* * * * *